United States Patent
Chassagne

(10) Patent No.: US 8,948,392 B2
(45) Date of Patent: Feb. 3, 2015

(54) METHOD OF PROVIDING AN AUTHENTICABLE TIME-AND-LOCATION INDICATION

(75) Inventor: Olivier Chassagne, Brussels (BE)

(73) Assignee: The European Union, Represented by The European Commission, Brussels (BE)

( * ) Notice: Subject to any disclaimer, the term of this patent is extended or adjusted under 35 U.S.C. 154(b) by 17 days.

(21) Appl. No.: 13/697,898

(22) PCT Filed: May 31, 2011

(86) PCT No.: PCT/EP2011/058989
§ 371 (c)(1),
(2), (4) Date: May 31, 2013

(87) PCT Pub. No.: WO2011/157554
PCT Pub. Date: Dec. 22, 2011

(65) Prior Publication Data
US 2013/0251150 A1   Sep. 26, 2013

(30) Foreign Application Priority Data

Jun. 15, 2010   (EP) .................................... 10166025

(51) Int. Cl.
*H04K 1/00*   (2006.01)
*H04W 12/06*  (2009.01)
*G01S 1/04*   (2006.01)
(Continued)

(52) U.S. Cl.
CPC ............. *H04W 12/06* (2013.01); *G01S 1/042* (2013.01); *G01S 1/08* (2013.01); *G01S 19/02* (2013.01);
(Continued)

(58) Field of Classification Search
CPC ............................... H04W 12/06; H04W 4/02
USPC ........... 380/270, 258, 43, 202, 203, 228, 229; 713/172, 176
See application file for complete search history.

(56) References Cited

U.S. PATENT DOCUMENTS 5,754,657 A     5/1998  Schipper et al.
6,446,206 B1 *  9/2002  Feldbaum .................... 713/175
(Continued)

FOREIGN PATENT DOCUMENTS

CN    201072441 Y    6/2008
JP    2006287327 A   10/2006
(Continued)

OTHER PUBLICATIONS

Sherman, Lo, et al., "Signal Authentication—A Secure Civil GNSS for Today", Oct. 2009, pp. 30-39.
(Continued)

*Primary Examiner* — Abu Sholeman
(74) *Attorney, Agent, or Firm* — Nath, Goldberg & Meyer; Joshua B. Goldberg; Sanjana Mangalagiri

(57) ABSTRACT

A method of providing an authenticable time-and-location indication using a radio-navigation signal receiver comprises receiving radio-navigation signals broadcast from a plurality of radio-navigation signal sources, at least some of the radio-navigation signals containing one or more cryptographic tokens protected by encryption, the cryptographic tokens being updated from time to time. The receiver retrieves, by decryption, the cryptographic tokens from the radio-navigation signals containing them. The receiver then determines positioning data, representing its geographical position and time, based on the radio-navigation signals received. The receiver generates a digital authentication code using a cryptographic function taking as inputs at least the positioning data and the retrieved cryptographic tokens, and produces a data package including a first part containing the positioning data and a second part containing the digital authentication code.

14 Claims, 3 Drawing Sheets

(51) Int. Cl.
*G01S 1/08* (2006.01)
*G01S 19/02* (2010.01)
*G01S 19/09* (2010.01)
*H04L 29/06* (2006.01)
*H04W 12/10* (2009.01)
*G01S 19/21* (2010.01)
*H04W 4/02* (2009.01)
*H04W 12/12* (2009.01)

(52) U.S. Cl.
CPC ............... *G01S 19/09* (2013.01); *H04L 63/123* (2013.01); *H04W 12/10* (2013.01); *G01S 19/215* (2013.01); *G01S 19/21* (2013.01); *H04W 4/02* (2013.01); *H04W 12/12* (2013.01)
USPC .......................................... 380/270; 713/172

(56) References Cited

U.S. PATENT DOCUMENTS

| | | | | |
|---|---|---|---|---|
| 8,646,060 | B1* | 2/2014 | Ben Ayed | 726/9 |
| 2009/0195354 | A1 | 8/2009 | Levin et al. | |
| 2009/0195443 | A1 | 8/2009 | Levin et al. | |
| 2009/0316900 | A1* | 12/2009 | Qiu et al. | 380/258 |
| 2013/0188651 | A1* | 7/2013 | Bosch et al. | 370/401 |
| 2014/0009336 | A1* | 1/2014 | Ruegamer et al. | 342/357.72 |

FOREIGN PATENT DOCUMENTS

| | | |
|---|---|---|
| JP | 2008283235 A | 11/2008 |
| WO | 2009001294 A2 | 12/2008 |
| WO | 2009090515 A2 | 7/2009 |
| WO | 2009150334 A1 | 12/2009 |
| WO | 2010030825 A1 | 3/2010 |

OTHER PUBLICATIONS

Chinese Office Action, Issued Feb. 26, 2014.
Japanese Office Action, Apr. 24, 2014.

* cited by examiner

METHOD OF PROVIDING AN AUTHENTICABLE TIME-AND-LOCATION INDICATION

This application is a National Phase filing of PCT/EP2011/058989, filed May 31, 2011, which claims priority from European Application No. 10166025.6, filed Jun. 15, 2010, the subject matter which are incorporated herein by reference in their entirety.

TECHNICAL FIELD

The present invention generally relates to authentication of positioning data. In particular, the invention relates to providing an authenticable time-and-location indication, e.g. as a digital time-and-location stamp attached to a document or other data, using a radio-navigation signal receiver. Another aspect of the invention relates to the authentication of the positioning data, i.e. the process of deciding whether or not an alleged time-and-location indication is authentic.

BACKGROUND ART

Secure radio-navigation, in particular satellite navigation, will tomorrow be as important and vital as secure Internet is today. However, many of the threats to satellite navigation cannot be prevented or combated through the current technologies at least for civilian mass-market applications.

There are a number of positioning applications, in which the genuine position of a user at a certain time needs to be known with a high degree of certainty and trust. Such applications include, for instance, fleet management, road tolling, geofencing, virtual site licenses, safety-critical location-based services, pay-as-you drive car insurance schemes, etc. In other applications, it may be necessary to establish whether a user was in possession of certain data at a certain time and in a certain location.

Market penetration and user acceptance of these applications will largely depend on their reliability and the confidence in the integrity and robustness of the services provided. In this context, the users of the invention encompass both receiver users, whose positions are determined based on radio-navigation signals of the radio-navigation system (one would typically refer to these users as "end users"), and service providers, who use the positioning data received from the end users. These service providers may be referred to as third party service providers because they are normally distinct from the operator of the positioning system.

The end users, on the one hand, typically want to be sure of the authenticity of the source of the radio-navigation signals. This preoccupation is linked to the concept hereinafter referred to as signal-in-space (SIS) authentication.

Third party service providers, on the other hand, typically want to have a guarantee that each positioning data that they receive from their end users (subscribers) actually corresponds to the end user's position at the indicated time. This implies, first, that the positioning data has been computed on the basis of genuine radio-navigation signals and, second, that it has not been tampered with, i.e. modified of falsified for the purpose of providing a wrong position or time.

The concept relating to the authentication of the positioning data declared by end users or transmitted by their radio-navigation signal receivers will hereinafter be referred to as the position-velocity-time (PVT) authentication. PVT stands for position-velocity-time, the most common set of positioning data calculated by receivers.

International patent application WO 2009/090515 addresses the problem of the authentication of positioning data in the context of infrastructure-free road tolling. The charging system in an automated road toll system is based on distance travelled, date and/or time of the travel, location (geographical area) and/or vehicle characteristics (length, cubic capacity, fuel consumption, $CO_2$ emissions, etc.). WO 2009/090515 aims at preventing a so-called "fake GPS attack", i.e. providing false GPS data to the tolling institution in order to reduce the road tolls payable. This is done by providing the tolling institution with vehicle condition sensor readings (speed, steering angle, travel distance, local weather, etc.). The tolling institution then crosschecks the GPS data with the vehicle condition data in order to authenticate or invalidate the GPS data.

International patent application WO 2009/001294 also relates to fraud prevention and detection in the context of a road tolling system. The user receiver retrieves the positioning data by receiving, down-converting and processing navigation signals. The tolling institution is then provided with the decoded position data as well as with raw data (samples of the down-converted navigation signals) and may then check whether the sample of raw data corresponds to that expected at the particular location and time indicated by the position information transmitted.

A similar approach is followed by U.S. Pat. No. 5,754,657, which discloses an authentication or validation method wherein the receiver whose position is to be validated or invalidated transmits an "augmented data signal" comprising raw radio-navigation signal data as well as the asserted position and time. The "augmented data signal" is transmitted to a central station, which essentially checks whether the raw data are consistent with the asserted position and time as well as with the signals broadcast by the satellites.

Another interesting solution is proposed in the article "Signal Authentication—A Secure Civil GNSS for Today", by Sherman Lo et al., published in the September/October 2009 issue of InsideGNSS. The authentication method disclosed in this article relies on the fact the GPS L1 frequency carries both C/A code and (encrypted) P(Y)-code signals, transmitted in phase quadrature. The user receiver transmits its computed position and time together with a snapshot of the (raw) P(Y)-code signals to an authentication authority. The method exploits that the P(Y)-code sequence received at a first location (the location of a receiver, whose position is to be authenticated) is identical to the P(Y)-code sequence received at a second location (the location of a reference receiver under the control of the authentication authority), if the difference of the satellite-to-receiver signal times is taken into account. The presence of a correlation peak in the (raw) P(Y)-code sequences recorded at the two locations establishes signal authenticity of the C/A code (if it is assumed that both receivers are not simultaneously within the reception range of the same signal-spoofing attacker). Aspects of the method disclosed in the article have also been the object of patent applications US 2009/0195443 and US 2009/0195354.

Basically, there are three different types of threats to the integrity of positioning data:

Threats to the integrity of the signals-in-space (e.g. jamming, spoofing and meaconing). These are threats occurring "upstream" of the computation of the positioning data. Jamming is the emission of a radio frequency signal or noise with sufficient power and with specific characteristics in order to supplant the navigation signals within the neighbourhood of the jammer. Jamming has the effect of preventing positioning receivers to acquire and track navigation signals within an area, the surface of which depends on the emission power of the jammer. The positioning receiver subjected to a jamming attack is rendered unable to produce PVT data or may only produce PVT data affected by high uncertainty (exhibiting a large error range). All signals, encrypted or not, can be jammed. Jammers are available on the market at low prices (less than € 100). Jamming can be detected by positioning receivers equipped with ad hoc devices and algorithms. Jamming is an illegal activity in most countries. Spoofing is the broadcast of signals resembling positioning signals by a simulator located on the ground in order to deceive positioning receivers. Spoofing is illegal in most countries. Spoofers cannot in principle simulate encrypted signals (e.g. the current GPS P(Y)-code, the future GPS M-code, or the future Galileo PRS- and CS-codes) unless they can break the encryption of the navigation code, which is very unlikely. Spoofers are not readily available on the market yet but can be easily produced by receiver manufacturers and/or by technically versed persons. It is expected that spoofers will be available in few years on the market for affordable prices between about € 100 and € 1000. Meaconing is the reception and rebroadcast of genuine navigation signals, with or without a time delay. The original signals are read using a high quality antenna, delayed and then retransmitted by an emitter, so that the delayed signals lead to the computation of a wrong position. Unlike spoofing, meaconing can, under certain conditions, deceive also positioning receivers working with encrypted navigation signals.

Threats to the computation of the PVT (e.g. hardware or software bugs, worms and/or viruses altering the computation process).

Threats to the integrity of the PVT after it has been computed (tampering with the computed PVT) or after it has been allegedly computed (in case of completely made up positioning data). A PVT could e.g. be intercepted and replaced by a fake PVT in the transmission over telecommunication networks between the user receiver and the third party service provider. It could also be modified when stored on electronic supports, e.g. within the service provider's facilities.

Technical Problem

There are two main concepts of authentication that occur in the context of radio-navigation. The first one is hereinafter referred to as "standalone SIS authentication", where "SIS" is the acronym of signal-in-space, i.e. the signal that arrives at the receiver. Standalone SIS authentication allows a user of a GNSS receiver, or the receiver itself, to verify that the signals used to compute a position are those of a given GNSS constellation (and not signals broadcasted by a malevolent earth-based or air-borne device) and has been computed by a trustable algorithm. Standalone SIS authentication thus aims at authenticating the sources of radio-navigation signals. Standalone SIS authentication addresses the following two questions, that each user of GNSS receiver is concerned with:

Is the receiver being spoofed?

Is the software of the receiver reliable?

The second concept of authentication is hereinafter referred to as remote PVT authentication. It serves third parties wanting to check the positions declared by users. Remote PVT authentication allows a third party to validate that positioning data produced by a radio-navigation receiver, be it integrated with other sensors or not, have not been tampered with, i.e. have not been modified or falsified for the purpose of providing e.g. a wrong position, a wrong velocity and/or a wrong time. The remote PVT authentication concept assesses the degree of reliability of positioning data already recorded and of the source that has produced these positioning data.

Remote PVT authentication addresses the following questions that a recipient of positioning data is concerned with:

Can these positioning data be trusted?

Do the positioning data come from the receiver claimed to have produced them?

End-to-end position authentication is the conjunction, or the combination, of both the standalone SIS authentication and the remote PVT authentication within a single application. It is exactly what the present example aims at.

It may be worth emphasizing again why one makes the distinction between standalone SIS authentication and remote PVT authentication.

Standalone SIS authentication ensures that the signals read by a radio-navigation receiver are those broadcasted by a GNSS constellation—or a pseudolite constellation—and not those broadcasted by a malevolent device. Standalone SIS authentication matters primarily to the end user. In other terms, standalone SIS authentication is what users of GNSS receivers want. It answers the question of whether the user of a GNSS receiver can trust the positioning provided by his or her receiver. Remote PVT authentication ensures that positioning data have not been tampered with from the very moment these positioning data were computed. The remote PVT authentication matters to third parties which are in a contractual relationship with users of the radio-navigation receivers or which have a control authority over users. It does not matter to the user of the radio-navigation receiver. In other terms, the remote PVT authentication is what third parties want. It answers the question of whether a third party can trust the positioning data sent by a user.

Additionally, the standalone SIS authentication could be used give the user information on the confidence level linked with the accuracy of the positioning, especially in situations where local effects such as multi-paths are perturbing SIS measurements.

It may be noted that standalone SIS authentication alone is of no value to third parties looking for trusted positioning data, because positioning data provided to the third parties could have been forged. Additionally, remote PVT authentication alone makes is less interesting without standalone SIS authentication: if the authenticity of the signals used to calculate the positioning data cannot be checked, the positioning data could have been computed based on spoofed radio-navigation signals. Even in the absence of any modification of the positioning data, they cannot be fully trusted.

It may further be noted that it is considered easier to trust one "trusted authority" than two authorities. In other words, while it is conceivable in theory to have two different entities, a first one providing standalone SIS authentication and a second one providing remote PVT authentication. However, in practice, the coexistence of two separate entities will render the procedures far more complex for the following reason: both depend on the same radio-navigation receiver and on its tamper-proof nature. In addition, if two different entities were to provide the standalone SIS authentication and the remote PVT authentication, respectively, the receiver would remain the weak link in the chain of trust. In such a case, there is always a risk of a man-in-the-middle attack at the interface, i.e. within the receiver. For example, people willing to cheat could place a PVT simulator between the two applications. Such an attack is impossible in the application described hereinafter.

It is an object of the present invention to provide a method for computing authenticable positioning data, i.e. positioning data the authenticity of which can be verified later on by an authentication authority. This object is achieved by a method as claimed in claim 1.

GENERAL DESCRIPTION OF THE INVENTION

The present invention can be implemented in the context of any kind of Global Navigation Satellite System (GNSS) or a radio-navigation system using a pseudolite constellation. A key aspect of the invention is that the radio-navigation signal sources (satellites or pseudolites) broadcast radio-navigation signals containing a cryptographic token within their data content. The cryptographic tokens may be considered as pseudo-random numbers or keys (e.g. in form of a binary sequence) that are updated from time to time under the control of an authentication authority. They are unpredictable in the sense that it is probabilistically impossible to derive future cryptographic tokens from the history of the cryptographic tokens, i.e. some or all of the previously broadcasted ones. In this sense, the cryptographic tokens may be considered as cryptographic nonces ("numbers used once")—even if a specific value of the cryptographic token may recur (at unpredictable times).

The cryptographic tokens are used as a cryptovariable by dedicated radio-navigation signal receivers to digitally stamp and/or to encrypt the computed positioning solution, i.e. the geographical position and time calculated on the basis of the radio-navigation signals received. The receivers then produce a data package comprising a first and a second parts, the first one including the positioning data (the positioning solution) and a receiver public identifier, and the second part containing a digest (hash value) or an encapsulation (encryption) of the positioning solution. The data packages may be stored at the receiver and/or communicated to other entities, e.g. a third party service provider.

In the present context, the term "positioning data" is understood to comprise time and geographical position (in 2D, e.g. as longitude and latitude, or in 3D, e.g. as longitude, latitude and altitude), possibly in combination with one or more of the following types of data:
  speed (vector);
  acceleration (vector);
  jerk (vector), i.e. the (vector of) rate of change of acceleration;
  heading (vector),
  accuracy and integrity data such as the dimensions of a confidence box centered on the computed time and geographical position, indicating which portion of space-time contains the actual time and geographical position with a given probability (confidence level).

Data packages may then be presented to the authentication authority, which checks whether the time and the geographical position indicated in the data package are consistent with the digest and/or the ciphertext. To this end, the authentication authority keeps an archive of the cryptographic tokens that have been broadcast or uses an algorithm to retrieve the cryptographic tokens corresponding to the asserted position and time. Depending on the outcome of the consistency check, the authentication authority may then establish a certificate stating the authenticity of the data package or indicating that the consistency check failed. If the consistency check fails, there is a strong presumption that the data package has been tampered with or generated under irregular conditions (e.g. under a jamming, spoofing or meaconing attack).

If the cryptographic tokens could easily be extracted from the data message of the radio-navigation signals, it would be theoretically feasible, for a malevolent third party, to archive the broadcast cryptographic tokens and to use these archived tokens to counterfeit, given a certain geographical position and time, a suitable digest and/or a ciphertext, and to assemble a data package in the correct format. In absence of further security measures the forged data package would then possibly be considered authentic by the authentication authority.

There are several options to render this kind of attack extremely difficult. In order to deny access to the cryptographic tokens, they are protected by encryption when broadcast on the radio-navigation signals. To this end, the cryptographic tokens may be distributed on secure radio-navigation signals. A radio-navigation signal is qualified as secure if one of the following conditions is met:
  (a) the radio-navigation signal is itself encrypted (i.e. the ranging code of the signal is encrypted) with a state-of the-art encryption algorithm, or
  (b) the radio-navigation signal is not encrypted (open signal) but the data message (including the cryptographic tokens), which it conveys is encrypted with a state-of the-art encryption algorithm; or
  (c) both the radio-navigation signal and its data message are encrypted with the same state-of-the-art encryption algorithm or two different encryption algorithms, with two different series of keys.

The cryptographic tokens may be common to some of or all the radio-navigation signal sources, i.e. these signal sources thus broadcast the same chronological sequence of cryptographic tokens. Alternatively, each radio-navigation signal source can be characterized by one specific cryptographic token. In this alternative option, each radio-navigation signal source broadcasts its own chronological sequence of cryptographic tokens, the sequences of tokens being mutually distinct amongst the various signal sources. In this option, the radio-navigation signal receiver receives a plurality of cryptographic tokens for every position fix. The cryptovariable used to digitally stamp and/or to encrypt the computed positioning solution is thus a function of the plurality of cryptographic tokens. In this scenario, the cryptovariable depends on the time of the position fix (as the cryptographic tokens are regularly updated) and on the geographical position (as the radio-navigation signal sources in visibility of the receiver depend on its current location). It shall be noted that, even in case that each radio-navigation source broadcasts its individual token sequence, there may be times at which some of the tokens received from different sources are accidentally equal in value.

As a further security aspect, access to the cryptographic tokens is preferably made conditional on using a predetermined type of receiver hardware (e.g. a crypto-module) and/or software, in particular a tamper-proof receiver hardware and/or software. The receiver thus advantageously comprises a security perimeter to execute all safety-critical operations and to prevent any third party from reading the cryptographic tokens. A fingerprint of the receiver software may be included into the data package to allow the authentication authority to check that the receiver software has not been altered. If an invalid fingerprint is provided to it, the authentication authority will issue a certificate alerting of the alteration of the software.

Preferably, the keys that give receivers access to the (encrypted) radio-navigation signals and/or the cryptographic tokens (preferably together with the navigation message) are distributed only to receivers that pass a verification of their software and/or hardware, according to a secure communication protocol. The keys to access the cryptographic tokens and/or the key to access the radio-navigation signals are preferably changed from time to time to ensure that receivers the security perimeter of which has been tampered with have no long-time access to the cryptographic tokens. This makes significantly more difficult for an attacker using cracked receivers to build a comprehensive archive of the past cryptographic tokens. In practice, in cases where keys are refreshed, when the keys giving access to the radio-navigation signals and/or the cryptographic tokens, stored in the receiver, are about to expire, the receiver may establish a secure communication channel with the authentication authority automatically or prompt the user to do so in order to retrieve the subsequent keys.

Whereas conventional digital signatures are concerned with the authenticating the author or the source of a message or a digital document, the invention does not authenticate the receiver user per se, but may extend the scope of digital signatures with secure information on when and where a digital signature has been produced, provided that the signing device is configured in accordance with the present invention.

Various segments of the radio-navigation system are concerned with the present invention, such as:

the ground segment of the radio-navigation system, which is in charge of, amongst others, synchronizing the satellites and/or pseudolites and preparing the data message to be broadcasted on the radio-navigation signals;

the segment of the radio-navigation signal sources (satellites and/or pseudolites); in the case of a global navigation satellite system, this is referred to as the "space segment" comprising typically about 24 to 30 operational satellites in a medium earth orbit on three or six different orbital planes;

the user segment comprising the radio-navigation receivers;

the authentication authority, or the authentication authority;

where applicable, a telecommunication segment for the transmission of data packages from receivers to providers of geo-localized services ("data packages network"); and a secure telecommunication segment for the distribution of the keys that give access to the radio-navigation signals and/or the cryptographic tokens to the receivers.

The applicant reserves the right to direct claims to the different aspects of the invention separately, possibly in one or more divisional or continuation applications where appropriate.

Turning first to the user segment, an aspect of the invention concerns a method of providing authenticable time-and-location data using a radio-navigation signal receiver. The method comprises receiving radio-navigation signals broadcast from a plurality of radio-navigation signal sources (e.g. satellites or pseudolites), at least some of these radio-navigation signals containing, within their data messages, one or more cryptographic tokens protected by encryption and updated from time to time, preferably under the control of an authentication authority. The receiver retrieves, by decryption, the cryptographic tokens from the radio-navigation signals. If the radio-navigation signals carrying the tokens are encrypted, the receiver gains access to the data messages of the signals using the corresponding key. Likewise, if the cryptographic tokens themselves are encrypted (on an open or encrypted signal), the receiver decrypts them using the appropriate key. The receiver then determines positioning data, including its geographical position and time (date and time of day), based on the radio-navigation signals received, i.e. it carries out a position fix and determines the time. The receiver generates a digital authentication code, which is either a cryptographic message digest, or a ciphertext, or a combination of a digest and a ciphertext, by means of a cryptographic function taking as inputs at least the positioning data and the retrieved cryptographic tokens. The receiver then produces a data package that includes a first part containing the aforementioned positioning data, a receiver public identifier (i.e. a marker written on the receiver), and a second part containing the aforementioned digital authentication code. The cryptographic tokens themselves are used to produce the digital authentication code but are not included into the data package.

Still within the user segment, another aspect of the invention concerns a radio-navigation signal receiver configured to carry out that method. To this end, the receiver is equipped with suitable software and hardware. An aspect of the invention thus concerns a computer program for a radio-navigation signal receiver, comprising instructions, which, when executed by the radio-navigation signal receiver, cause it to operate according to the method.

The cryptographic function may e.g. produce, as the digital authentication code, a digital digest in form of a hash value of the positioning data and possibly the receiver public identifier, using, as a cryptovariable, a cryptographic key that is a function (e.g. a concatenation) of at least the retrieved cryptographic tokens. Alternatively or additionally, the cryptographic function may encrypt the positioning data and possibly the receiver public identifier using such cryptographic key as a cryptovariable.

It shall be noted that, in addition to the positioning data and the receiver public identifier, the cryptographic function may take as inputs further data to protect, e.g. one or more digital documents, such as digital photos, user identification data, signal-in-space integrity data, a receiver software fingerprint, complementary positioning data, digital signatures etc. The digital authentication code in this case serves to establish that these additional data were stored or handled by the receiver at a certain time and in a certain location.

The invention can thus be used to protect not only the identification of the receiver and the positioning data it produced but also in addition other information identifying or relating to the user; and/or any digital document processed by the receiver, such as photos, films; scanned documents, measurements data files.

Advantageously, the additional data to protect can include:

Identification data identifying the receiver user and/or any digital form of administrative authorizations owned by the user (such as a driving license, a pilot's license, a vehicle registration certificate, a vehicle insurance certificate, digital rights for accessing multimedia documents); including a fingerprint of the program code of the receiver software; and/or attack alert data; and/or any digital data or document produced by a device such a measurement device, a photocopy machine, a photo camera, a video recorder, etc, equipped with an built-in radio-navigation signal receiver.

For sake of simplicity, the positioning data and the optional further data to protect may hereinafter be referred to simply as the "data to protect".

There are various ways in which the cryptographic function may be configured to protect the data it receives as inputs. For instance, the cryptographic function could produce a hash value (digest) of some or all of the data to protect using the cryptographic key as a cryptovariable. The cryptographic function could also encrypt some or all of the data to protect, using the cryptographic key. The cryptographic function can thus be configured to output a hash value and/or a ciphertext of the data to protect. If some of the data to protect are hashed only (but not encrypted), these data have to be included into the first part the data package as plaintext in the same format as when they are used as an input for the cryptographic (hashing) function, in order to enable the authentication authority to check the consistency of the data in plaintext with the hash value. However, if the data are encrypted, meaning that it is possible for the authentication authority to retrieve the original data from the digital authentication code by decryption, they need not be included into the data package necessarily in the same format as when they are used as an input for the cryptographic function (i.e. typically in plaintext).

It is worthwhile recalling that the digital authentication code may contain some other data in addition to the positioning data and the receiver public identifier. In this case, the authentication authority can confirm that these additional data were processed by the receiver at a certain time in a certain location. Another point worth mentioning is that the data package may be encrypted (in full or in part) by the user after it has been produced, for example, in order to protect the user's privacy. The data package then needs to be decrypted before it is presented for authentication to the authentication authority or the latter has to be provided with the key to decrypt the data package, so that the authentication authority can retrieve the content of the plaintext and the digital authentication code.

The cryptographic key used for hashing and/or encrypting the data to protect preferably comprises a concatenation of cryptographic tokens broadcast via the different radio-navigation signal sources. Nevertheless, the cryptographic key may also be obtained by a more complicated function of the cryptographic tokens (e.g. including permutation or mixing of the tokens, etc.). The function that is used to generate the cryptographic key from the tokens is known only to the authentication authority, which, upon being requested to authenticate a data package presented to it, retrieves the cryptographic tokens corresponding to the alleged geographical position and time (from an archive or using a secret algorithm), for the purpose of reconstructing the cryptographic key used by the cryptographic function of the receiver.

The radio-navigation signal receiver may have stored a secret key, called thereinafter as the receiver secret identifier, known to the authentication authority only (the secret key is a "shared secret" of the receiver—not of the user—and the authentication authority). It may be stored for example within the receiver by its manufacturer under a license agreement with the authentication authority. In such a case, the function used to generate the cryptographic key may use the receiver secret identifier as an input in addition to the cryptographic tokens. The cryptographic key could e.g. be a concatenation of the cryptographic tokens and all or part of the secret key. This option is especially advantageous in order to ensure a constant length of the cryptographic keys in the case of plurality of cryptographic tokens, given that the number of sources with visibility from the receiver may vary in time and depending on location. In case of a GNSS, for instance, the number of radio-navigation satellites in visibility of the receiver is indeed not constant. Therefore, if the cryptographic key were obtained, for example, by concatenation of only the cryptographic tokens, the length of the key would vary and so would the strength of the cryptographic key and the robustness of the authentication code. The cryptographic key thus preferably has a fixed length (number of bits), with the length being chosen sufficient for robust encryption. The receiver thus advantageously uses a part of the receiver secret identifier to fill up any vacant bits, i.e. to arrive at the predefined length of the cryptographic key.

Preferably, in case of a plurality of cryptographic tokens, the data package contains in its first or second part data identifying those signal sources broadcasting the cryptographic tokens used by the receiver to compute the cryptographic key ("signal source identification data"). This option is especially preferred, since the asserted time and location is not sufficient in all instances for the authentication authority to determine which cryptographic tokens have been actually retrieved by the radio-navigation receiver. Time and location information indeed allows establishing which signal sources were theoretically visible to the receiver. Reception of radio-navigation signals from some of these sources could however have been prevented (e.g. due to masking). In the absence of further indications on which cryptographic tokens actually used by the receiver, the authentication authority would have to check many of the theoretically possible combinations of cryptographic tokens until it finds the one that was used to generate the cryptographic key. In contrast, if the sources of the cryptographic tokens are indicated in the data package, the authentication authority can quickly identify the cryptographic tokens on the basis of the positioning data (time and location) and the data identifying the signal sources. Once the cryptographic tokens have been identified, the authentication authority can check the consistency of the data to protect and the digital authentication code and issue a certificate authenticating the data to protect or declaring them invalid.

As already indicated above, the radio-navigation signal receiver preferably comprises a security perimeter within which at least the security-critical steps are carried out. These steps include, for instance: retrieving the cryptographic tokens from the radio-navigation signals, determining the positioning data and generating the digital authentication code. A receiver software fingerprint may be included into the digital authentication code. In this case also the step of computing the software fingerprint is carried out within the security perimeter. The skilled person will be aware of which steps are preferably carried out within the security perimeter to defeat attacks.

In a variant of the invention, the positioning data are calculated not only from pseudorange measurements but also phase measurements.

Alternatively, the receiver may calculate positioning data from pseudorange measurements and, possibly, phase measurements, of both open and encrypted signals. The receiver may be configured to detect inconsistencies between the positioning data obtained from open-signal observables and positioning data obtained from encrypted-signal observables. If the calculated geographical positions differ by more than an acceptable threshold, the receiver may decide to discard the measurements made on open signals and/or even to trigger an alert presuming a spoofing attack on the open signals if the inconsistency cannot be explained by normal disturbances like multi-paths.

Advantageously, the receiver may also compute positioning data based on multi-frequency measurements, i.e. using radio-navigation signals broadcast at different frequencies. In some circumstances, the receiver may be able to detect meaconing attacks, i.e. signals that are re-broadcasted by a ground-based emitter with or without the introduction of a time delay. In a meaconing attack, the data messages of the radio-navigation signals remain unchanged. All signals, whether open or encrypted, are exposed to the threat of being meaconed. A meaconing attack can be detected when at least one of the available radio-navigation frequencies is not meaconed. The receiver may thus be configured to compute positioning data for the different frequencies separately, or for different combinations of frequencies, and to check for any incoherence of the different positioning data computed at (substantially) the same time.

In this context, it may be worthwhile noting that the use of encrypted radio-navigation signals does not remove the threat of a jamming attack. However, jamming can be detected relatively easily by a state-of-the-art radio-navigation signal receiver.

Data concerning alerts triggered by the receiver can be advantageously included into the digital authentication code as part of the data to protect by the receiver. The data could then be collected by the authentication authority and used to build a database. The database could be monitored by the authentication authority or another service provider to localize detected threats. Jamming, spoofing, meaconing or other attacks detected could thus be reported by the authentication authority to the competent national authorities to localize and, ideally, neutralize the attacker.

Turning now specifically to the ground segment, an aspect of the invention concerns an authentication authority as already mentioned on several occasions hereinabove. The authentication authority carries out a method of checking authenticity of the data to protect included in a data package presented to it. That method comprises receiving a data package having been, or having the appearance of having been, produced according to the method as described hereinabove. It is assumed that the data package presented to the authentication authority includes positioning data and a digital authentication code, wherein the positioning data represent alleged geographical position and time, and wherein the authentication code has at least the appearance of being one. (If a data package presented to the authentication authority is clearly in a wrong format, there is no need to continue. The authentication procedure may then be aborted and an error message may be issued to whom has presented the data package.) The authentication authority retrieves the one or more cryptographic tokens, which a radio-navigation signal receiver would have received if it had actually been at the alleged geographical position at the alleged time. The authentication authority checks whether the positioning data and the digital authentication code are consistent with one another. It finally authenticates the data package (including the time-and-location indication contained in the positioning data) if the positioning data and the digital authentication code are consistent with one another, or rejects the data package as invalid if the positioning data and the digital authentication code are not consistent with one another. The certificate, where positive, may contain, if need be, an indication of the level of trust than can be attributed to the positioning data, based for example of the number of authenticated signals used for the fix.

It shall be noted that the procedure carried out by the authentication authority is adjusted to the format of the data package, which has to be determined in advance by way of a standard.

A third party service provider (e.g. a "pay-as-you-drive" insurance company, or a tolling authority, etc.) may receive data packages from its subscribers. It may submit the data packages to the authentication authority for authentication. The authentication authority then returns a certificate to the requester having submitted a data package stating whether the data package, in particular the date-and-time indication contained therein, is authentic. The third party service provider could submit every data package it receives from its subscribers to the authentication authority for authentication. Alternatively, it may submit samples randomly selected among all the data packages it receives. The third party service provider may also examine the data packages for irregularities and submit preferably apparently irregular data packages to the authentication authority.

The authentication authority preferably determines the values of the cryptographic tokens to be distributed via the radio-navigation sources. After generation thereof at the authentication authority, the cryptographic tokens are transmitted, through secure communication, to uplink stations, which upload the token to the radio-navigation signal sources, e.g. the satellites. Alternatively, the cryptographic tokens are generated outside the authentication authority, e.g. by one or more command centers of the radio-navigation system, and transmitted using secure communication to the authentication authority for storage in an archive and to the uplink stations for uploading to the radio-navigation signal sources.

Instead of storing all the past cryptographic tokens, the authentication authority could resort to a generating function that outputs the cryptographic tokens corresponding to a certain time. In this variant, the authentication authority is preferably prepared for changing the generating function, or the parameters thereof, from time to time. The authentication authority then has to keep an archive of the generating functions or the parameter settings and their corresponding time periods.

It should be noted that there may be more than one authentication authority. In case of a plurality of authentication authorities, there is preferably a common archive of cryptographic tokens or a common computation center for calculating cryptographic tokens corresponding to a certain time, to which archive or computation center all the authentication facilities have a secure access. Alternatively, each authentication authority could have its own archive or computation center. Whichever option is chosen, care must be taken to keep the cryptographic tokens and/or the generating function thereof secret. This may be easier with a single authentication authority.

In the signal source segment, an aspect of the invention are the radio-navigation signal sources, which broadcast radio-navigation signals containing one or more cryptographic tokens protected by encryption, the cryptographic tokens being updated from time to time.

Another aspect of the invention concerns the radio-navigation signals themselves and the use of such signals, e.g. for providing an authenticable time-and-location indication. The radio-navigation signals are characterized by one or more cryptographic tokens embedded within their data content and protected by encryption.

Those skilled will appreciate that the different aspects of the present invention establish an integrated approach to provide users of a radio-navigation system (end users as well as third-party service providers) with a high level of security.

The use of encrypted radio-navigation signals, possibly on multiple frequencies and/or in combination with open radio-navigation signals, of a tamper-proof receiver and receiver software will confer high confidence in the positioning data. In case of an attack on the radio-navigation signals (e.g. by jamming, spoofing or meaconing), a receiver operating in accordance with what has been said above has the best chances to detect the attack and alert the user. In addition, a user may easily determine whether their receiver operates correctly by sending a data package to the authentication authority. As the receiver could be configured to regularly send a data package to the authentication authority, e.g. when downloading the keys to access encrypted radio-navigation signals and/or the cryptographic tokens.

The invention allows anyone who is in possession of a data package to obtain confirmation whether the receiver that the data package claims to have been produced with was in the asserted position at the asserted time. If the data package contains further data (e.g. a document), the applicant of the data package to the authentication authority also may receive the confirmation that the further data were packaged by the receiver in the asserted location at the asserted time.

The invention thus provides an enhanced chain of trust, within the framework of a radio-navigation system (e.g. the future European GNSS or a pseudolite network) from the signals in space to the addressee of a data package containing a time-and-location indication. In this sense, the invention achieves end-to-end positioning data authentication, which represents a significant step towards secure radio-navigation.

The invention increases the robustness of radio-navigation against malevolent threats on radio-navigation signals and ensures the protection of positioning data against malevolent attempts to alter them and provides a means to geo-tag and time-tag any kind of documents in a secure manner.

The invention can be usefully combined with an application augmenting the accuracy of positioning through the secure delivery of correction data, allowing a secure and more accurate positioning and timing means.

BRIEF DESCRIPTION OF THE DRAWINGS

A preferred embodiment of the invention will now be described, by way of example, with reference to the accompanying drawings in which.

DESCRIPTION OF PREFERRED EMBODIMENTS

Introduction

In the following, a possible implementation of the invention using the Commercial Service (CS) of the European GNSS (known as Galileo) will be addressed in more detail. The example of the Commercial Service has been chosen here mainly because it will constitute the first GNSS service to offer to civilian users encrypted radio-navigation signals, which is probably the most practical and secure way to achieve standalone SIS authentication.

The example discussed hereinafter explains the different aspects of the invention in more detail. The example relates to the production by a radio-navigation signal receiver of digital digests with the input of cryptographic token(s) embedded in the data message of CS navigation signals for the purpose of authenticating:

the positioning data produced by an authorized radio-navigation receiver on the basis of radio-navigation signals broadcasted by a local, regional or global navigation satellite system or a ground-based pseudolite system;

and the identity of the radio-navigation receiver and, where appropriate the identity of the user of the receiver and/or any type of administrative authorization awarded to him or her;

and/or, where appropriate, documents of any sort, which are geo-tagged and time-tagged by the receiver.

System Architecture

Figure 1:
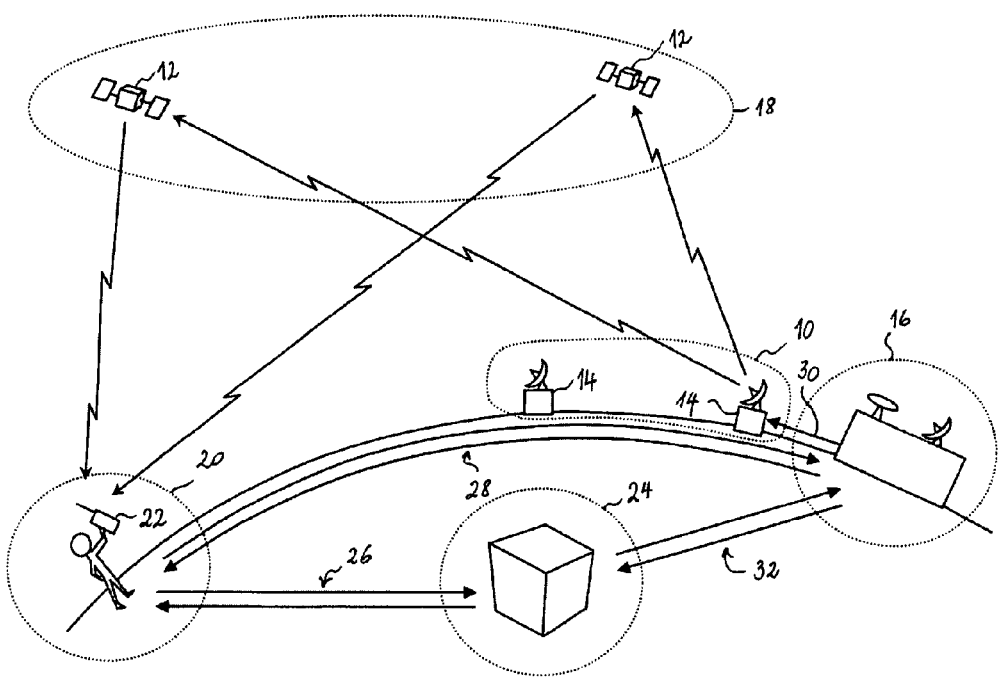
FIG. 1 is a schematic illustration of a GNSS configured according to the present invention.

The architecture of the example is illustrated in FIG. 1. The GNSS comprises a ground segment 10, which is in charge of, amongst others, synchronizing all satellites 12 and/or pseudolites (not shown) and preparing the data message to be broadcast on the radio-navigation signals. The ground segment 10 includes several uplink stations 14 controlled by a trusted authentication authority, called hereinafter the Authentication Service Centre 16.

The GNSS also comprises a space segment 18 with a plurality of radio-navigation satellites 12 orbiting in a medium earth orbit on three or six different orbital planes and/or a plurality (more than 5) of synchronized pseudolites.

The user segment 20 of the GNSS comprises the users' radio-navigation receivers 22.

The users may be subscribers of a third party service provider 24, providing geo-localized services.

There is a telecommunication segment 26 for the transmission of data packages from subscriber receivers 22 to the third party providers 24 (the "data packages network") and a secure telecommunication segment 28 for the distribution of the navigation keys ("navkeys") from the Authentication Service Centre 16 to the user receivers (the "navkeys network").

The Authentication Service Centre 16 ensures:
the provision of cryptographic tokens;
the provision of secret identification numbers for the receivers 22;
the authentication of the data packages produced by the receivers 22;

The ground segment 10 allocates some space within the data messages of the CS radio-navigation signals for the broadcast of cryptographic tokens. It encrypts the entire data messages before uploading them to the satellites 12 or ensures that the satellites 12 encrypt the radio-navigation signals.

The Authentication Service Centre 16 produces cryptographic tokens through a state of the art algorithm. The refreshment rate of the cryptographic keys that result from the tokens is dependent on the level of robustness sought. This rate will be constrained by the level of availability of up-link-stations 14 and of their connectivity with the satellites 12: data messages are indeed uploaded—and thus refreshed—through up-link stations onto the satellites at different points in time.

The Authentication Service Centre 16 keeps an archive of all cryptographic tokens that it has produced.

The Authentication Service Centre 16 has a secure communication link 30 with the ground mission segment of the Galileo system, which controls the up-link stations, for the transmission of the tokens, from the Authentication Service Centre to the ground segment; and for the transmission of the tokens read by sensor or monitoring stations from the ground mission segment to the Authentication Service Centre.

The user receivers 22 are equipped with a specific hardware (crypto-module) and a specific software to retrieve the cryptographic tokens from the CS radio-navigation signals, to generate a digital authentication code using a cryptographic function taking as inputs at least the positioning data computed by the receiver and the cryptographic tokens, and to provide a data package including at least the positioning data and the digital authentication code.

Third party service providers 24 may request authentication of their subscribers' data packages to the Authentication Service Centre 16. The Authentication Service Centre 16 then checks whether the positioning data (and possibly further data to protect) are consistent with the digital authentication code contained in the data package and returns to the third party service provider a certificate indicating the outcome of the verification.

Distribution of the Cryptographic Tokens

The data message of each radio-navigation signals produced by the space segment allocates a fixed number of bits for the cryptographic token. This length is determined by the level of robustness envisaged for the application. This length should not be changed; otherwise the software of all dedicated receivers must be updated to take into account this change in the structure of the data message.

The values of the cryptographic tokens are changed at certain time intervals in order to defeat a hacker willing to crack the encryption used for the production of a digital authentication code. The refresh rate will be limited by the physical capacity of the ground and space segments.

The data message contains all the data necessary to enable the receiver to make a position fix with the encrypted radio-navigation signals carrying the cryptographic tokens.

The Commercial Service of the European GNSS uses encrypted radio-navigation signals in E6B frequency band. The data message of the E6B signals may be used to broadcast the cryptographic tokens. In the following description, it is thus assumed that cryptographic tokens are broadcasted in the E6B data message.

According to the Mission Requirement Document v7.0, the European GNSS ranging code encryption on the E6B (data channel) and E6C (pilot signal without data channel) signals is based on a robust Advanced Encryption Standard (AES) symmetric algorithm with 256-bit keys. The algorithm is used in Counter mode. The secret keys necessary for GNSS receivers to access the encrypted radio-navigation signals, i.e. the navigation keys, are managed and distributed by the Authentication Service Centre to the users and are renewed between every week to every 3 months. For the purpose of their distribution, the navigation keys are encrypted with the Receiver Secret ID and sent to the receiver through the Internet. If the receiver has no direct interface with the Internet, the navigation keys are sent in a first step to a personal computer and uploaded in a second step in the receiver, e.g. with a USB flash drive. The length of the Receiver Secret ID is herein assumed to amount to 256 bits.

As indicated hereinbefore, a radio-navigation signal is qualified as secure if one of the following conditions is met:
(a) the radio-navigation signal is itself encrypted (i.e. the ranging code of the signal is encrypted) with a state-of the-art encryption algorithm, or
(b) the radio-navigation signal is not encrypted but the data message (including the cryptographic tokens), which it conveys is encrypted with a state-of the-art encryption algorithm; or
(c) both the radio-navigation signal and its data message are encrypted with the same state-of-the-art encryption algorithm or two different encryption algorithms, with two different series of keys.

The E6 signals thus allow performing fully trustable pseudo-range measurements (unlike E1 signals, which can be easily spoofed) and thus to compute equally fully trustable PVT.

The Authentication Service Centre of the Galileo Commercial Service computes a cryptographic token for each satellite and for each validity period of the cryptographic tokens. These cryptographic tokens are uploaded onto the satellites through an uplink station and then broadcasted by the satellites.

Each satellite SVi (i being the number of the satellite or "space vehicle") broadcasts a specific cryptographic token, called hereinafter "$NONCE_{SVi}$,", on the data message. The length of each $NONCE_{SVi}$ could be for example 32 bits.

The data message comprises amongst others within 448 bits:
  the navigation message for E6B. This will allow receivers to continue navigation even in an environment where E1A and E5A signals are either jammed or spoofed. This will pre-empt at most 50 bits per second from the data bandwidth of 448 bits per second on E6B.
  Additional data allowing the receiver to reconstruct the navigation message for E1A, allowing navigation on E6B and E1A, even in cases where E1A is spoofed. An unpredictable value for each new cryptographic token ($NONCE_{SVi}$).

$NONCE_{SVi}$ is specific to satellite SVi. Thus, normally: $NONCE_{SVi}(t) \neq NONCE_{SVj}(t)$, if $i \neq j$. Nevertheless, there may be times at which two or more cryptographic tokens are accidentally equal.

The Authentication Service Centre archives all cryptographic nonces in an archive (the "NONCEs archive").

Computation of Data Packages by the Receiver

Figure 2:
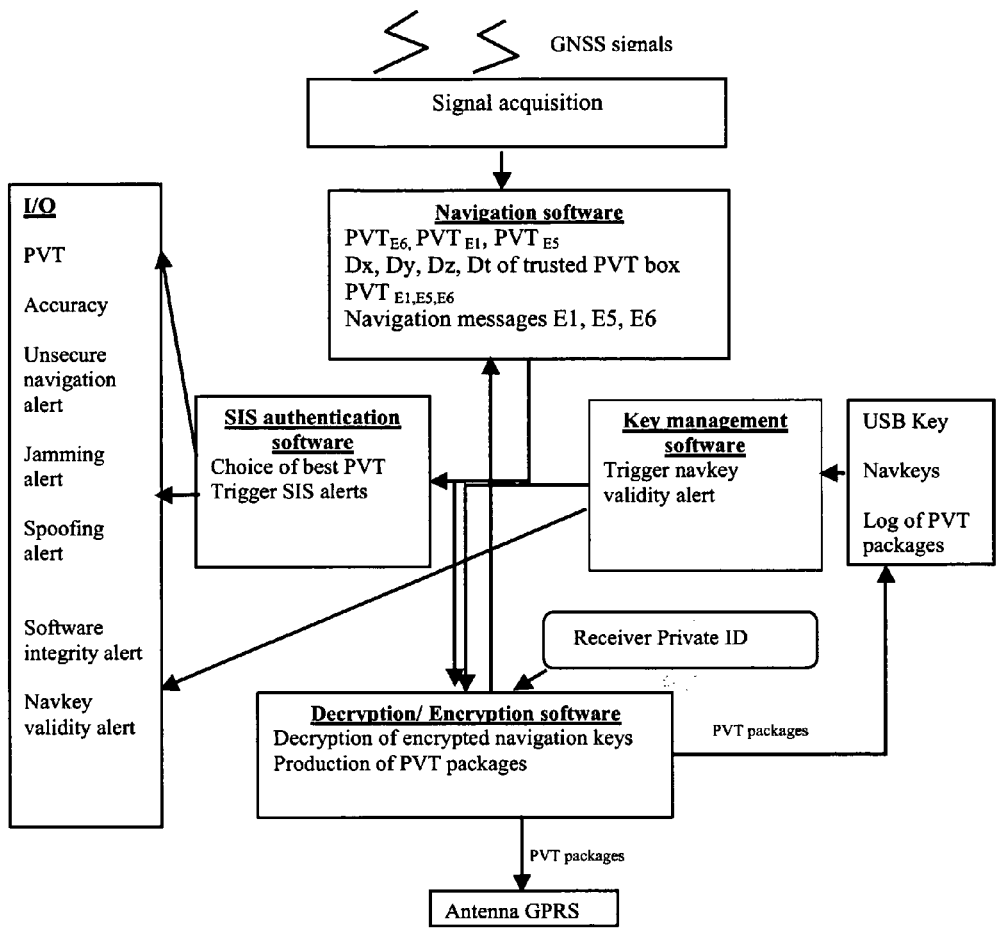
FIG. 2 is a schematic block diagram of the receiver software.

FIG. 2 gives an overview of a possible implementation of the receiver software. The software comprises four main components:
  the SiS authentication software;
  the key management software;
  the encryption/decryption software;
  the navigation software.

The keys needed for the user receivers to accede the radio-navigation signal and/or the cryptographic tokens are transmitted over a secure communication network and managed within the receiver in a crypto-module and the key management software.

The receiver software relies first and foremost on the pseudo-range measures computed on the basis of the secure radio-navigation signals. Only the positioning data obtained from secure radio-navigation signals can be considered as secure.

In addition to the usual inputs provided by the navigation message of each radio-navigation signal, additional data can be added on the data message of the secure radio-navigation signals in order to help the navigation software. For example, the navigation software of the receiver can take into consideration:
  integrity data delivered by the GNSS operator over the secure radio-navigation signals;
  navigation correction data provided by the GNSS operator or by the Authentication Service Centre;
  clock differentials with other frequency (ies) of the space segment.

The navigation software could be configured for Receiver Autonomous Integrity Monitoring (RAIM) and/or comprise an augmentation function (fed by correction data) such as, e.g., Precise Point Positioning.

The receiver produces a data package comprising two parts:
  Part 1 comprises "readable information", containing "plaintext" data, including positioning data.
  Part 2 is the so-called "digital authentication code".

The digital authentication code allows the Authentication Service Center to authenticate the data to protect. The digital authentication code can comprise part or all of the data to protect. If the digital authentication code contains a hash value of certain data, these data have to be present in the plaintext part (part 1). Otherwise, the authentication service center will not be able to check the digital authentication code.

It is possible to include data both in part 1 and in part 2 of the data package. While it is true that this duplicates information in general, it may be interesting for some applications to be able to retrieve the data contained in the digital authentication code, in situations where the latter disagrees with part 1.

Figure 3:
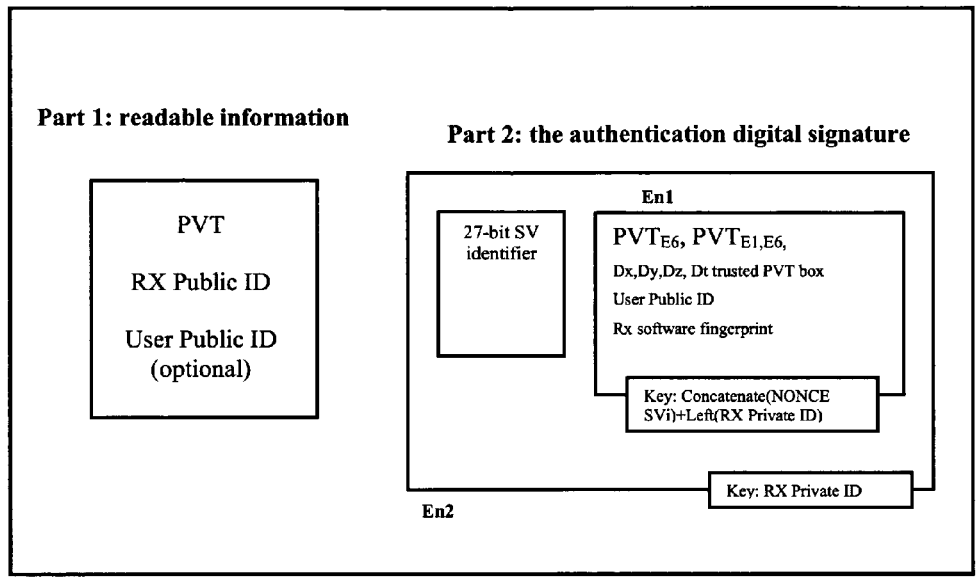
FIG. 3 is an illustration of an authenticable data package.
Figure 4:
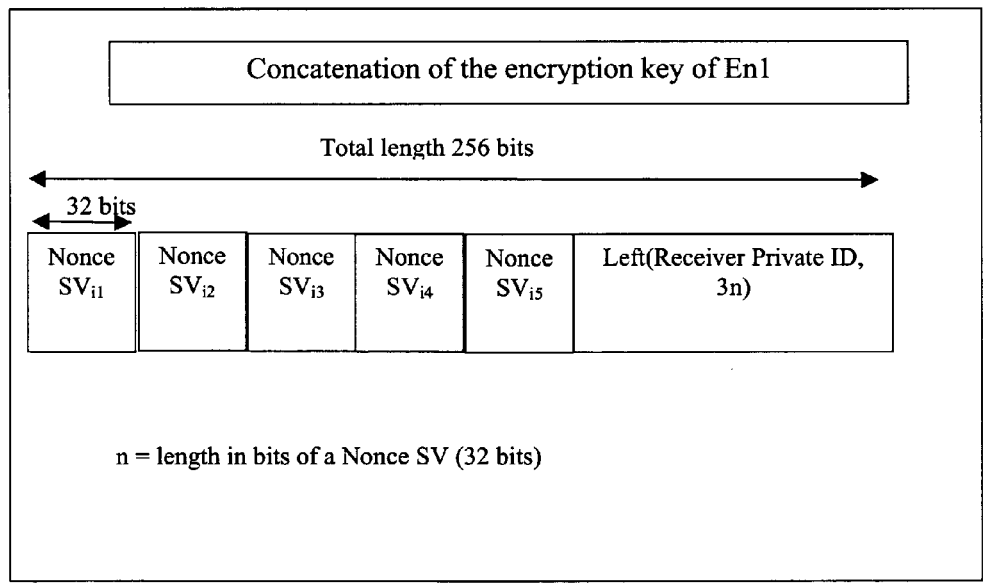
FIG. 4 is an illustration of the computation of a cryptographic key based on the cryptographic tokens retrieved by a GNSS receiver.

Turning now to the preferred radio-navigation receiver illustrated in FIG. 3, it is a tamper-proof at least bi-frequency GNSS receiver (E1A/E6B bands). Preferably, the receiver is configured to handle E1, E5 and E6 radio-navigation signals. The security perimeter of the receiver includes at least the E6 correlators and baseband processing.

The receiver is also equipped with an inertial navigation system (INS). The receiver is further equipped with a USB slot. The user inserts a dedicated USB flash drive into the slot to upload the navigation keys. The USB flash drive may also be used to transfer other data to the receiver, such as e.g. the User Public ID, which could be a driving license for example.

The USB flash drive also stores all data packages, or at least or sample of them at a predetermined interval, for a predetermined period. All the data packages are stored in an encrypted form in order to protect privacy, if for example the USB flash drive is stolen. The data packages may be transferred from the USB flash drive to the Authentication Service Centre through the user's personal computer, each time the user asks on the website of the Authentication Service Centre for the next navigation keys. The transfer of data packages enables the Authentication Service Centre to perform an a-posteriori remote PVT authentication. For this application (i.e. deferred remote PVT authentication) the Authentication Service Centre sends—with the authorization of the user—all data packages and their corresponding certificates to the user's services providers.

The receiver can be equipped with a terminal for wireless telecommunication such as GPRS, G3 or G4. This telecommunication link is used to achieve near real-time PVT authentication for a third party. This function (i.e. the near real-time remote PVT authentication) would be very valuable for the tracking in real time of sensitive goods or of parolees but less interesting for applications such road user charging or pay-as-you-drive insurance schemes.

The Receiver Public ID is preferably marked on the receiver in a visible way.

The Receiver Private ID is stored in a tamper-proof memory. It is known neither by the user nor by any other party, except by the Authentication Service Centre.

The receiver software is stored in the same or another tamper-proof memory. Preferably, the memories for the receiver software and the Receiver Private ID, respectively, are separate, in order to avoid potential erasure the Receiver Private ID during a software update.

The receiver is preferably powered by a secure power cable so that it cannot be physically switched off.

The receiver could also be equipped with a DSCR emitter transmitting on a short distance the information of whether the receiver is switched on and is correctly functioning. These measures may prevent a user from voluntarily switching off their receiver to avoid payments or penalties due to a service provider.

The software of the receiver has four main functional blocks:
  the navigation software in charge of computing PVTs from the navigation signals;
  the key management software in charge of uploading the encrypted navigation keys from the USB flash drive of the user;
  the SIS authentication software in charge of detecting jamming, spoofing and meaconing attacks;
  the decryption/encryption software in charge of producing the "authentication digital code" and of decrypting encrypted navigation keys.

The receiver allocates two correlation channels to each satellite (one on E1A and the other on E6B). The receiver then acquires the ranging codes on E1A and E6B, reads the navigation message on E1 and E6B, and extracts from the E6B data message the nonce broadcast by the satellite.

The navigation software computes two PVT solutions, the first one based on E6B signals only and the second one based on all signals available, including E1 and E6.

The first PVT is called PVTE6. It is computed using only E6B pseudo-range measurements (PRE6).

The second PVT is called PVTE1, E6. It is based on iono-free pseudo-range measurements (referred to as PRionofree), which are computed according to the formula:

$$PR_{ionofree} = \frac{f_{E1}^2}{f_{E1}^2 - f_{E6}^2} PR_{E1} - \frac{f_{E6}^2}{f_{E1}^2 - f_{E6}^2} PR_{E6},$$

where $f_{E1}$ is the Galileo E1A frequency carrier (1575.42 MHz), $f_{E6}$ is the Galileo E6B frequency carrier (1278.750 MHz), $PR_{E1}$ is the E1 pseudo-range, and $PR_{E6}$ is the E6 pseudo-range.

The navigation software can estimate a four-dimensional "confidence box" centered on $PVT_{E6}$, and defined by time, horizontal and vertical dimensions. It takes into account all possible errors in a navigation based on E6B only. The four dimensions of the trusted PVT box can be computed by the receiver on the basis of data provided by the Authentication Service Centre on the state of the constellation.

The size of the trusted PVT box can be significantly reduced if the software is coupled with a high accuracy service on E6B allowing the receiver to benefit from a greater accuracy of the positions of satellites (high-accuracy ephemerides) and of the satellite clock drifts.

It may be worthwhile noting that $PVT_{E1, E6}$ is more accurate but not fully secure compared to $PVT_{E6}$ whereas $PVT_{E6}$ is less accurate but fully reliable. Position $PVT_{E6}$ is the sole trustable solution since it is computed on the basis of the secure and trusted signals (because the latter are encrypted). This position-time is accurate within determined error margins in all four dimensions Dx, Dy, Dz, and Dt.

The confidence box indicates that the true position and time of the receiver ($PVT_{exact}$), is contained in the confidence box with a predefined probability (confidence level).

The dimensions of the confidence box depend on the configuration of the Galileo constellation at the point in time in question. The dimensions of the box could be significantly reduced if the system is coupled with a high-accuracy application applied on E6B.

If E1 signals are spoofed, the receiver will be either unable to compute $PVT_{E6, E1}$ and will thus trigger a spoofing alert, or will be able to compute $PVT_{E6, E1}$ which is likely to fall outside the trusted PVT box. If $PVT_{E6, E1}$ is indeed outside the boundaries of the trusted PVT box, the receiver will also trigger an alert.

In case of such an alert, the receiver will only output $PVT_{E6}$ and the dimension of the confidence box. The latter will then be considered the best approximation of the true position and time.

If no alert is triggered, the receiver outputs both $PVT_{E6}$ and $PVT_{E6,E1}$. $PVT_{E6,E1}$ will then be considered the best approximation of the true position and time.

Management of the Navigation Keys

The user may download the navigation keys of E6B signals over the Internet on a regular basis, say once per month. These keys will be produced by the Galileo operator or alternatively by the Authentication Service Centre.

The Galileo operator assigns to E6B payloads on all satellites the same navigation key in order to encrypt the navigation signals with this unique navigation key. The authentication solution described here could also work with a different navigation key assigned to each satellite.

The user downloads the navigation keys in advance of the change. The user will login on the secure Internet website of the Authentication Service Centre. To that effect, he or she will be identified by his or her login (for example the Receiver Public ID) and a secret password. When identified, it can submit a request for the renewal of the key and insert the USB flash drive into the computer to that effect.

The request is handled by the database software of the Authentication Service Centre. The database contains all logins, secret passwords, Receiver Public IDs and Receiver Private IDs. The database server identifies the Receiver Public ID and thus retrieves the corresponding Receiver Private ID. The Receiver Private ID is then used to encrypt the navigation key with a symmetric encryption algorithm. The website then downloads the encrypted navigation key onto the USB flash drive up to the personal computer of the user.

In the meantime, the website application will upload all data packages stored on the USB flash drive inserted into the personal computer. Later on, these data packages are certified by the Authentication Service Centre and then sent to third party service providers designated by the user.

When the new navigation keys have been downloaded onto the USB flash drive, the user inserts the USB flash drive into the radio-navigation signal receiver. This insertion triggers the following actions. The key management software of the receiver checks whether a new encrypted navigation key is stored in the USB flash drive. If so, the software uploads the encrypted navigation key into a memory within the security perimeter of the receiver.

The decryption and encryption software then decrypts the encrypted navigation key with the help of the Receiver Private ID stored inside the security perimeter and saves the decrypted version of the navigation key into another tamper-proof memory within the security perimeter, together with the parameters of validity over time.

The key management software deletes the navigation keys the validity of which has expired.

If necessary, the key management software alerts the user through the interface of the receiver of the imminent termination of the validity of the current navigation key and, if need be, of the absence of a valid navigation key for the next navigation period. In the absence of a key for the current period, the receiver will no longer be able to track and acquire E6B signals. In such a case, the standalone SIS authentication function is lost and the subsequent remote PVT authentication by the Authentication Service Centre is no longer possible.

Real-Time Processing of the SIS Authentication by the Receiver

In first instance, the SIS authentication software indicates to the user through the receiver interface from which Galileo satellites E6B data messages have been acquired and decrypted, that is to say which Galileo satellites are visible from the receiver when the latter computes the PVT.

The second task of the SIS authentication software is to continuously monitor and detect jamming attacks. For example the SIS authentication software triggers a jamming alert if the receiver looses one frequency but still receive signals on another frequency from the same satellites. This alert indicates which frequency has been lost.

If signals in E6B band have been lost but E1 or E5 signals are still read by the receiver, the SIS authentication software triggers an alert indicating that the satellite navigation is no longer secure and asks the navigation software to switch to INS navigation mode.

If the radio-navigation signals have been lost on all frequencies, the SIS authentication software triggers an alert indicating that the satellite navigation is no longer possible and asks the navigation software to switch to INS navigation, too.

The SIS authentication software detects spoofing attacks, that is to say situations where an attacker modifies the navigation data broadcasted on open signals. A spoofing alert will be triggered for example when the ephemerides read on the E1 signal (not immune to spoofing) are different from the ephemerides read on E6 (immune to spoofing according to the current state of art).

The SIS authentication software may also detect meaconing attacks in some situations. A meaconing attack is deemed to take place where signals-in-space are re-broadcasted by a ground-based emitter with or without the introduction of a time delay. In a meaconing attack, the data messages of the signals-in-space remain unchanged. All signals, be they open or encrypted like E6B can be meaconed. A meaconing attack can be detected when at least one of the available radio-navigation frequencies is not meaconed, for example when $PVT_{E1}$ or $PVT_{E5}$ leaves the trusted PVT box centered on $PVT_{E6}$. The software here detects an incoherence of positions computed each on the basis of the signals on one frequency at a time.

However the SIS authentication software cannot detect a meaconing attack modifying in parallel the delay of transmission of signals on all radio-navigation frequencies. That being said, the introduction within the receiver of an inertial navigation system (INS) should in theory allow the receiver to detect such attacks. When subjected to such attacks, the receiver equipped with some INS should detect an inconsistency between a new PVT computed on the basis of the INS and the last PVT and the PVT computed on the basis of the navigation signals.

The SIS authentication software would upon request check the software embarked on the receiver with the help of fingerprint stored on the USB flash drive. If the SHA256 of the software does not match the fingerprint in question, this means that the software installed on-board the receiver has been modified and an alert regarding the software integrity will be triggered.

Encapsulation of the PVT by the Receiver

In addition to a position shown on a map on the screen, the receiver produces within its security perimeter an output (the data package) intended to be sent to, and used by, third parties. The data package comprises two parts (cf. FIG. 3):

Part 1 ("the readable information"), which includes the following information:
 $PVT_{E1,E6}$;
 Receiver Public ID;
 User Public ID (optional);
a Part 2 ("the digital authentication code") is an encryption of the following information:
 A 27-bit field identifying Galileo satellites used for the PVT computation $PVT_{E6}$;
 $PVT_{E6}$;
 The dimensions of the trusted PVT box;
 $PVT_{E1,E6}$;
 User Public ID (optional);
 the fingerprint of the receiver software computed with SHA256.

The data package should not be split, truncated or modified in any case. Otherwise it would loose its authenticable character. It should thus be produced, transmitted, stored and archived always under the same format.

The encapsulation software can produce Part 1 ("the readable information") either clear or ciphered, depending on whether the user wants to protect his or her privacy. The encryption of Part 1 is then made only for the purpose of protecting privacy but not at all for the purpose of authenticating later on the data package. The possibility to encrypt Part 1 is a complement to the authentication application, but not one of its essential features.

Part 1 ("the readable information") may be encrypted or not encrypted, depending on the choice made by the user on the receiver to protect her or his privacy, since Part 1 can be tapped by malevolent parties at any time after this information has left the receiver. If Part 1 is ciphered, the following scheme will be applied in order to manage the user tribe:

The user introduces a secret key into the receiver.
Part 1 of then ciphered with this secret key using a symmetric cryptographic algorithm.
The user has the responsibility to distribute his or her secret key to his or her tribe and to his or her services providers in a secure way.

Part 2 ("the digital authentication code") is necessarily encrypted and cannot be read, except by the Authentication Service Centre. The ciphering algorithm is, at least, a 192-bit elliptic curve integrated encryption scheme (ECIES). The software producing Part 2 is called thereafter the decryption/encryption software.

The receiver secret ID is unique, unknown to the user and to any third party, and protected inside the security perimeter of the receiver.

Part 1 ("the readable information") is intended to be used by any third party, including providers of geo-localized or timing services, whereas Part 2 which will accompany Part 1 in any circumstance, can be read and thus used only by the Authentication Service Centre.

Moreover, users can transmit the same data packages (Part 1+Part 2) to an unlimited number of providers of geo-localized or timing services and to their tribes (relatives, friends, colleagues). Each of the recipients of this information can indeed lodge at any time a request for an authentication before the Authentication Service Centre, provided that Part 2 has remained attached to Part 1.

The main task of the encapsulation software is to cipher the information indispensable for the future authentication of the PVT by encapsulating it in Part 2 of the data package in a two-step procedure, as described below.

All the ciphering operations are performed within the security perimeter of the receiver.

Part 2 ("the digital authentication code") is produced by two successive encapsulations.

The first encapsulation covers a set of data composed of:
$PVT_{E6}$,
The four dimensions of the trusted PVT box,
$PVT_{E1,E6}$,
Receiver Public ID,
User Public ID (optional),
the fingerprint of the receiver software computed with SHA256.

This package of data is encrypted through a symmetric encryption algorithm with a key corresponding to the concatenation in a predetermined order of all NONCEs read by the receiver on the E6B data messages. This encryption produces the first encapsulation called thereafter En1.

The encryption is obtained by the concatenation of 8 cryptographic tokens of satellites in visibility in a predetermined order, for example the increasing sorting of the satellites identifiers. If there are less than 8 Galileo satellites in visibility for the receiver, the field of nonces left vacant will be replaced by an extract of the Receiver Private ID. This precaution is taken in order to ensure to all encapsulations the maximum robustness with a key of the maximal length (256 bits). FIG. 5 illustrates the computation of a cryptographic key (with a length of 256 bits) when only five satellites are in visibility of the receiver. The cryptographic key is obtained by concatenation of the available cryptographic tokens ($NONCE_{SVi1}, \ldots, NONCE_{SVi5}$) and a part of the Receiver Private ID. The Receiver Private ID is truncated in such a way as to achieve a key with the predefined length.

The second encapsulation covers a package of data composed of:
En1;
a 27-bit element revealing the Galileo satellites used to compute the PVT and thus to encrypt En1 (through the concatenation of the corresponding NONCEs);

In a second stage, this package is encrypted through a symmetric encryption algorithm with the Receiver Secret ID as the key. This encryption produces the second encapsulation called thereafter En2. En2 is Part 2 of the data package ("the digital authentication code").

Part 1 ("the readable information") and Part 2 ("the digital authentication code") are then finally assembled in a predetermined format into the data package. The data package is then sent over any telecommunication network, called thereafter the data package network—to all services providers with which the user has signed a contract or an agreement.

Data Package Distribution

The data packages can be transported by any type of media. The data package network could be typically a terrestrial radio-frequency network used for data transmission such as GPRS, G3 or G4, which prove convenient to reach mobile vehicles. They could be transmitted in real time or near real time to a third party service provider. The data packages could also be transmitted in deferred time, preferably at regular intervals. This could be done with a USB flash drive and the Internet, or via any other telecommunication connection. The provider may request to the authentication service center authentication of the data packages it receives (in real time or in deferred time).

The navkeys network and data packages network can be the same network. This situation will be easier to handle within the receiver, since it reduces the number of telecommunication terminals.

This situation may also present another advantage for applications not requiring a remote PVT authentication in real time or near real time. Instead of transmitting packages to a number of third parties (service providers) interested in the data produced by the receiver, the latter can send all its packages to one focal point, the Authentication Service Centre, that can send them to the designated third parties together with a certificate. The sending of one or more data packages to the authentication authority may be made conditional for the delivery of the next navigation keys. The user will thus be forced to provide at certain intervals their positioning data, since otherwise they would lose access to the secure radio-navigation signals and/or the cryptographic tokens. Another advantage of this approach is that the authentication service center may check the integrity of the receiver software (using the software fingerprint contained in the digital authentication code) and that one can thus avoid distributing the navigation keys to receivers with a cracked security perimeter.

Protection of the PVT after its Computation

The receiver produces the data package, formed of two parts:
- Part 1 is the "readable information", containing the PVT in plaintext, provided in a predetermined format, and the public identifier of the receiver ("the Receiver Public ID").
- Part 2, the digital authentication code encompassing, amongst others, in an encrypted format, the identification of the receiver, $PVT_{E6}$ and $PVT_{E6,E1}$ and the dimensions of the trusted PVT box.

A ground-based telecom segment (called thereafter the data packages network) ensures that the information produced as described above is transmitted to any location-based service provider. The information can be transported by any type of media:
- in (near) real time through a ground-base wireless network such as GPRS, G3 or G4;
- or in deferred time, preferably at regular intervals, through the USB flash drives and the Internet.

The recipients of the data packages may be third party service providers who may submit a request for authentication to the Authentication Service Centre. Alternatively, the data packages may be sent to the Authentication Service Centre. In this case, the third party service providers connect themselves to the server of the Authentication Service Centre in order to get from this centre the data packages of their clients and their respective certificates.

The Authentication Service Centre is the only entity capable of reading the digital authentication code (part 2). At the request of a service provider wanting to check the data packages sent by its customers, the authentication service center checks whether the "plaintext" data (part 1) and the digital authentication code are consistent with one another. The positioning data will be considered "correct" only if the Authentication Service Centre can guarantee that the positioning data in question have been produced by a reliable and identifiable receiver and computed by recognized and licensed software, on the basis of secure radio-navigation signals. If part 1 and part 2 of the data package match, the Authentication Service Centre provides to the service provider a certificate, which guarantees that the data to protect were integrated into the data package at the indicated time in the indicated location. If the two parts do not match, the Authentication Service Centre provides to the applicant a certificate warning that the data package failed the authentication test (e.g. because the positioning data or the identification of the receiver have been corrupted and that consequently, the data package cannot be authenticated).

A third party service provider may send to the Authentication Service Centre a request for authentication together with the complete data package received by the service provider from one of its customers. The authentication authority may be configured so as to interpret the submission of a data package as a request for authentication.

The Authentication Service Centre then decrypts Part 2 ("the authentication key") and check that the information contained in Part 2 is consistent with the information contained as plaintext in Part 1.

If the data of the two parts match, the Authentication Service Centre provides to the requester a certificate, which certifies that the data package passed the consistency check and that it may thus be trusted.

If the two parts do not match, the Authentication Service Centre provides to the requester a certificate warning that the data package failed the consistency check and that consequently, it cannot be authenticated.

Remote Processing of the PVT Authentication

If a service provider or any other third party is willing to verify the veracity of the information contained in Part 1 ("the readable information") of a data package, it has to address the Authentication Service Centre.

In this embodiment of the invention, only one authority worldwide is able to authenticate data packages produced by receivers. By authentication it is meant to send to any applicant a certificate indicating whether the PVT, the Receiver Public ID and, if any, the User Public ID, as declared in Part 1 "in plaintext" are correct and which level of trust can be given to this information. The authority in question is the Authentication Service Centre.

The Authentication Service Centre treats all requests for authentication certificates it may receive through a specific software, called hereinafter the "authentication software". Applicants submit requests for authentication certificates together with the corresponding data packages over a secure network, called the certificates network (reference number 32 in FIG. 1). The certificates network could be achieved through encrypted exchange of data over the Internet.

The authentication software reads the Receiver Public ID in Part 1. This software has access to three databases of the Authentication Service Centre:
- the archives of all cryptographic tokens;
- the list of all couples of a Receiver Public ID and a Receiver Secret ID.
- A collection of the footprints of all versions of licensed receiver program codes.

The Authentication Service Centre manages and updates the second database, where it records all couples of Receiver Public ID and Receiver Secret ID for the entire fleet of licensed receivers. The Authentication Service Centre would have assigned couples of Receiver Public ID and Receiver Secret ID to licensed manufacturers for the production of receivers.

Step 1: Check of Part 1

In first instance the authentication software checks whether Part 1 contains both a PVT and Receiver Public ID in a correct form. For example, if Part 1 has been encrypted by any party before being submitted in attachment to a request for authentication, the authentication request will abort. In particular, Part 1 should be in clear i.e. not encrypted.

If the declared PVT and/or Receiver Public ID are/is not in a correct form, the authentication software issues a certificate indicating that the authentication process cannot be performed due to a corrupt Part 1.

Step 2: First Decryption of Part 2

The authentication software retrieves the Receiver Secret ID, based on the Receiver Public ID declared in Part 1 ("the readable information"), of the receiver which has produced the Data package in question.

The authentication software then uses the Receiver Secret ID to decrypt Part 2—or En2—of the data package. It will then read En1—not yet usable since En1 is encrypted—and a pattern of 28 bits identifying the Galileo satellites used for the computation of the PVT.

If the authentication software cannot decrypt Part 2 with the Receiver Secret ID, then the authentication software will issue on the certificate with an alert indicating that either:
- the Receiver Public ID has been corrupted, meaning that the corresponding Receiver Secret ID is not the correct decryption key;
- or Part 2 ("the digital authentication code") has been corrupted and cannot thus be decrypted.

A certificate with such an alert will imply that the PVT declared in Part 1 cannot be authenticated. Conversely, it does not necessarily mean that the PVT has been spoofed or falsified.

If the authentication software can decrypt Part 2 with the Receiver Secret ID, then the authentication software will issue a preliminary information in the certificate indicating that the Receiver Public ID declared in Part 1 is correct.

Step 3: Second Decryption of Part 2

Based on the list of Galileo satellites declared in the space vehicle identifier field of En2, the authentication software computes decryption key for En1, thanks to the archives of the cryptographic tokens of all Galileo satellites. This key is a concatenation in a predetermined order of the cryptographic tokens retrieved based on the timing provided by Part 1 of the data package (and, possibly, the Receiver Private ID).

Thanks to this key, the authentication software is able to decrypt En1 and thus to access all the following data computed by the receiver:

$PVT_{E6}$, $PVT_{E1,E6}$,

Receiver Public ID,

User Public ID (optional), the dimensions of the trusted PVT box.

The authentication software reads all the data—contained in Part 2 in an encrypted form—and compare them with the data of Part 1 in order to check whether the two sets of data are consistent.

To that effect, the authentication software will check:

whether $PVT_{E1,E6}$ corresponds to the PVT declared in Part 1;

whether $PVT_{E1,E6}$ is contained in the trusted PVT box centered on $PVT_{E6}$.

whether the User Public ID optionally declared in Part 1 matches with the User Public ID contained in Part 2.

whether the hash value (fingerprint) of the software contained in Part 2 corresponds to a version of the software recognized by the Authentication Service Centre as reliable.

Depending on the outcome of these checks, the software produces a digital certificate indicating whether the declared PVT is correct and if so, what the trusted accuracy attached to it is and whether the declared User Public ID, if any, is correct.

The reason for a two-step encryption and then two-step decryption is linked to the fact that the authentication software cannot guess in advance which satellites were in visibility of the receiver are at the time of the PVT computation. In theory, one encryption and one decryption could have been sufficient. Indeed, based on the timing of the PVT declared on Part 1 and on its position on the globe, the software could derive which were then the 8 or less Galileo satellites in the sky above the receiver. However, some of these satellites could have been masked and consequently not detected by the receiver. In order to get the right decryption key, the software would have to perform $2^8$ tests with all possible concatenations of cryptographic tokens, corresponding the combination of situations where each of the 8 satellites has been seen or not. In order to avoid these trials, that could delay the authentication processing, the second encryption and the corresponding first decryption will give to the authentication software the right information about which satellites have to be taken into account in order to compute the decryption key in order to get access the encapsulated PVT.

Step 4: Transmission to the Requester of an Authentication Certificate

The Authentication Service Centre then sends to the requester the submitted data package together with a certificate indicating:

Info 1: whether Part 1 is in the correct format;

Info 2: if so, whether the declared Receiver Public ID is correct;

Info 3: if so, whether the declared PVT has not been tampered with;

Info 4: if so, whether the software on-board the authentication receiver is recognized by the Authentication Service Centre;

Info 5: if so, whether the navigation messages on E1, E6B (and optionally also E5A) are consistent;

Info 6: if so, whether the declared PVT is contained in the trusted PVT box;

Info 7: whether the declared User Public ID is correct;

Info 8: if so, the "authentication" accuracy measured in meters and based on the dimensions of the trusted PVT box.

Infos 1 to 8 are Boolean data. Info 8 is an integer number. These pieces of information indicate the following:

If Info 1 is FALSE, then the certificate has no value of any sort and the other Infos are irrelevant.

If Info 2 is FALSE, then the certificate has no value of any sort and the other Infos are also irrelevant.

If Info 3 is FALSE, then the certificate proves that the PVT declared in Part 1 has been modified after its computation in the receiver;

If Info 4 is FALSE, then the certificate proves that the software used to compute the PVT is not known to the Authentication Service Centre;

If Info 5 is FALSE, then the certificate proves that the receiver has been supposedly subjected to a spoofing attack on E1 but that $PVT_{E6}$ is still trustable;

If Info 6 is FALSE, then the certificate proves that the receiver has been most probably subjected to an attack on radio-navigation signals but that $PVT_{E6}$ is still trustable;

If Info 7 is FALSE, then the certificate proves that the User Public ID, if any, declared in Part 1 has not been modified but that after its computation in the receiver.

The certificate does not provide the PVT or the Receiver Public ID. In other words, if Part 1 ("the readable information") is submitted in an encrypted way or if it is missing, then the applicant is considered by the Authentication Service Centre not to be allowed by the receiver's user to get access to this information. Then the Authentication Service Centre will reveal neither the PVT nor Receiver Public ID. In other terms, the authentication service is not intended—although it could technically do it if Part 2 (the digital authentication code) has not been re-encrypted—to break a privacy protection.

The production of certificates for data packages coming from all parts of the world indirectly enables the Authentication Service Centre to ensure a worldwide surveillance of the navigation frequencies and thus to detect and localize jamming, spoofing and meaconing attacks. The Authentication Service Centre could for example alert the national authorities of the states concerned by such identified attacks.

Robustness Against GNSS Threats

Robustness Against Jamming

The application cannot protect against an attack simultaneously on all navigation frequencies. However—if at least one of the navigation frequencies is not jammed—the jamming attack will be detected and defeated, that is to say that the receiver can still rely on the PVT derived from the frequency in question.

Robustness Against Spoofing

Existing spoofers cannot simulate any encrypted signal. In particular they cannot simulate E6B Galileo ranging codes. Therefore, E6B codes are not vulnerable to spoofing threats.

However, a first direct acquisition on E6B is very complex due to the fact that E6B spreading code are none periodic cryptographic sequences. A good estimate of the time is mandatory and implies that a first signal acquisition is done on E1A. This first estimate of the time will allow starting the acquisition process on E6B. If the navigation message on E1A is tampered with (by spoofing) then the E6B acquisition cannot start. Thus, the first countermeasure is to check whether E6B acquisition can be performed. If not, the receiver used an E1A compromised signal.

Moreover, to compute a $PVT_{E6}$, trustable navigation data (ephemeris, clock corrections, etc) are needed on the data message of E6B.

Therefore, the authentication receiver checks the integrity of each received navigation data by comparing the fingerprint of the navigation data received on the encrypted E6B signal and the SHA-256 value of the navigation data received on E1A (for all the Galileo satellites used to compute a PVT solutions).

The cryptographic token aims to provide an anti-replay mechanism against attack on the encryption of the authentication digital code.

The authentication receiver will compute two PVT solutions (using the same Galileo satellites). However, although $PVT_{E1, E6}$ is the most accurate one, only $PVT_{E6}$ is robust against spoofing attacks and is the trustable reference to be used to determine the confidence area (standalone SIS authentication).

Robustness Against Meaconing

Meaconing is the most effective means to deceive GNSS receivers. Even so-called "robust" services such as GPS P(Y)-code or Galileo PRS are not immune to meaconing.

However meaconing can be defeated in the case where the attacker does not meacon all the spectrum of frequencies used for navigation purposes, that is to say E1, E5 and E6. A multi-frequency receiver can then easily detect inconsistencies between the positioning provided by $PVT_{E1}$, $PVT_{E5}$ and $PVT_{E6}$. This will be the case for receivers according to the present example.

Some meaconing attacks can also be detected where a receiver detects a sudden jump in the position and/or in the timing of the computed PVT. The authentication receivers will integrate this function.

Meaconing attacks exerting a progressive drift of time and/or position on receivers can remain undetected if these receivers rely on GNSS signals only. Such attacks can however be detected provided that the receivers are also equipped with inertial navigation sensors. Authentication receivers will include such sensors.

Robustness Against Possible Alteration of Positioning Data

The application cannot prevent an attacker from modifying the PVT and/or the Receiver Public ID in Part 1 of the data package, especially if the information to protect is stored or transmitted in plain text. The application will, however, serve to detect such alteration.

To combat PVT tampering, the receiver software may include an algorithm enabling the user to protect the generated data package to be sent to the services providers and the user's tribes. This encryption is a good means to protect against an attempt by a third party to modify in Part 1 of the data package the PVT and/or the Receiver Public ID.

Vulnerabilities Against Attacks on the Application Itself

All the security assets, including the receiver firmware are implemented inside the security perimeter of the Authentication receiver. Besides, the host equipment includes mechanisms allowing checking data and software integrity used to compute PVT.

The dedicated GNSS receiver will be equipped with a crypto-module preventing the critical software and security assets from being read and thus stolen (including by the user or the service provider).

The threat is here that an attacker produces false trusted data packages, which will pass the "certificate test" with success and which are nevertheless forged. In order to defeat the authentication application, the attacker will have:

(1) to break a Receiver Private ID;
(2) to archive over the time period concerned with the attack all NONCEs and all ephemerides; and
(3) to achieve reverse engineering of the encapsulation software.

Action (1) will be very difficult to achieve. It will require to get an unauthorized access to the Receiver ID database of the Authentication Service Centre or to read the content of the tamper proof memory of the Authentication receiver. Or alternatively, the Receiver Private ID can be broken by "brute force attacks" but the only data encrypted with the Receiver Private ID is only 28 bit-long. The current state-of-the-art algorithms are already immune to brute force attacks with the computational power of computers of today. The short length of the encrypted data would make it even harder for an attacker to break the key in the future. Another threat is that the manufacturer keeps a trace of the relation between the Receiver Public ID and the Receiver Private ID and that this trace is stolen: manufacturers must be compelled to destroy such information after the production of the authentication receivers.

Action (2) is only possible if the attacker has access to the navigation keys over a long period of time and can archive all the NONCEs identified on the E6B data message. Action (2) should be prevented by:

imposing a security perimeter on all CS receivers (the first step is not to make public the Commercial Service Interface Control Document and to allow the construction of Commercial Service receivers only to licensed manufacturers);

setting high standards of security perimeter of authentication receivers;

protecting the distribution of the navigation keys.

Action (3) can be first achieved by stealing licensed encapsulation software. The distribution and updating of this software must this be ensured through protected channels. Reverse engineering will be prevented in a satisfactory manner by a regular and frequent refreshment of the cryptographic tokens.

None of these actions is achievable by any hacker on the basis of the current best technologies.

The invention claimed is:

1. A method of providing an authenticable time-and-location indication using a radio-navigation signal receiver, said method comprising the following steps:

a) receiving radio-navigation signals broadcast from a plurality of radio-navigation signal sources, at least some of said radio-navigation signals containing one or more cryptographic tokens per signal source protected by encryption, said cryptographic tokens being updated from time to time;

b) retrieving said cryptographic tokens from said radio-navigation signals containing them, by decryption;

c) determining positioning data based on said radio-navigation signals received, said positioning data, including geographical position and time of said radio-navigation signal receiver;

d) generating a digital authentication code using a cryptographic function taking as inputs at least said positioning data and said retrieved cryptographic tokens;

e) producing a data package including a first and a second part, said first part containing said positioning data and a receiver public identifier and said second part containing said digital authentication code; and f) providing further data to protect user identification data, signal-in-space integrity data, a receiver software fingerprint, further positioning data, digital signature identifying the user and/or one or more digital documents, wherein said digital authentication code is generated using said cryptographic function taking as an input also said further data to protect.

2. The method as claimed in claim 1, wherein each of said radio-navigation signals containing a cryptographic token contains a cryptographic token specific to the radio-navigation signal source broadcasting said radio-navigation signal.

3. The method as claimed in claim 2, wherein said first part or said second part further contains source identification data identifying the radio-navigation signal sources having broadcast the radio-navigation signals that said cryptographic tokens have been retrieved from.

4. The method as claimed in claim 1, wherein said cryptographic function produces as said digital authentication code a hash value or a ciphertext of at least said positioning data, based on a cryptographic key that is a function of at least said retrieved cryptographic tokens.

5. The method as claimed in claim 4, wherein said cryptographic function produces said hash value or ciphertext of at least said positioning data and said receiver public identifier.

6. The method as claimed in claim 1, wherein said cryptographic function produces a hash value or a ciphertext of at least said further data to protect based on said cryptographic key.

7. The method as claimed in claim 4, wherein said cryptographic key comprises a concatenation of said cryptographic tokens.

8. The method as claimed in claim 7, wherein said receiver has stored therein a receiver secret identifier known to said authentication authority and wherein said cryptographic key comprises a concatenation of said cryptographic tokens and part or all of said receiver secret identifier.

9. The method as claimed in claim 1, comprising encrypting said second part.

10. The method as claimed in claim 1, wherein those of said radio-navigation signals that contain a cryptographic token are encrypted radio-navigation signals and/or contain said cryptographic token as a part of an encrypted data content.

11. The method as claimed in claim 1, comprising requesting from said authentication authority navigation keys to accede said one or more cryptographic tokens protected by encryption and receiving said navigation keys via a secure communication channel.

12. The method according to claim 1, wherein said radio-navigation signal receiver comprises a security perimeter within which part or all of steps a) to f) are carried out.

13. A radio-navigation signal receiver comprising a memory and a processor coupled to perform:

a) receiving radio-navigation signals broadcast from a plurality of radio-navigation signal sources, at least some of said radio-navigation signals containing one or more cryptographic tokens per signal source protected by encryption, said cryptographic tokens being updated from time to time;

b) retrieving said cryptographic tokens from said radio-navigation signals containing them, by decryption;

c) determining positioning data based on said radio-navigation signals received, said positioning data, including geographical position and time of said radio-navigation signal receiver;

d) generating a digital authentication code using a cryptographic function taking as inputs at least said positioning data and said retrieved cryptographic tokens;

e) producing a data package including a first and a second part, said first part containing said positioning data and a receiver public identifier and said second part containing said digital authentication code; and f) providing further data to protect user identification data, signal-in-space integrity data, a receiver software fingerprint, further positioning data, digital signature identifying the user and/or one or more digital documents, wherein said digital authentication code is generated using said cryptographic function taking as an input also said further data to protect.

14. A method of checking authenticity of a data package, said method comprising:

receiving a data package having allegedly been produced according to a method of providing an authenticable time-and-location indication using a radio-navigation signal receiver, said data package including a first part containing positioning data and a second part containing a digital authentication code, said positioning data including alleged geographical position and time, said method of providing an authenticable time-and-location indication using a radio-navigation signal receiver comprising the following steps:

a) receiving radio-navigation signals broadcast from a plurality of radio-navigation signal sources, at least some of said radio-navigation signals containing one or more cryptographic tokens per signal source protected by encryption, said cryptographic tokens being updated from time to time;

b) retrieving said cryptographic tokens from said radio-navigation signals containing them, by decryption;

c) determining positioning data based on said radio-navigation signals received, said positioning data, including geographical position and time of said radio-navigation signal receiver;

d) generating a digital authentication code using a cryptographic function taking as inputs at least said positioning data and said retrieved cryptographic tokens;

e) producing said data package including said first and said second part, said first part containing said positioning data and a receiver public identifier and said second part containing said digital authentication code; and f) providing further data to protect user identification data, signal-in-space integrity data, a receiver software fingerprint, further positioning data, digital signature identifying the user and/or one or more digital documents, wherein said digital authentication code is generated using said cryptographic function taking as an input also said further data to protect;

retrieving one or more cryptographic tokens that said radio-navigation signal receiver would have received had said radio-navigation signal receiver actually been at said geographical position at said time;

checking whether said positioning data and said digital authentication code are consistent with each other;

authenticating said data package when said positioning data and said digital authentication code are consistent with each other, or rejecting said data package as invalid when said positioning data and said digital authentication code are not consistent with each other.

* * * * *